(12) United States Patent
Carew et al.

(10) Patent No.: US 6,512,764 B1
(45) Date of Patent: Jan. 28, 2003

(54) METHOD AND APPARATUS FOR PROVIDING VOICE SIGNALS TO AND FROM A TELECOMMUNICATIONS SWITCH

(75) Inventors: A. J. Paul Carew, Austin, TX (US); Ronald D. Lutz, Jr., Round Rock, TX (US); Brendon W. Mills, Austin, TX (US)

(73) Assignee: General Bandwidth Inc., Austin, TX (US)

( * ) Notice: Subject to any disclaimer, the term of this patent is extended or adjusted under 35 U.S.C. 154(b) by 0 days.

(21) Appl. No.: 09/356,250

(22) Filed: Jul. 16, 1999

(51) Int. Cl.[7] ................................................ H04L 12/66

(52) U.S. Cl. ...................... 370/356; 370/476; 379/88.17

(58) Field of Search ................................. 370/351, 352, 370/353, 354, 355, 356, 476, 400, 401; 709/238; 379/88.17

(56) References Cited

U.S. PATENT DOCUMENTS

| | | | |
|---|---|---|---|
| 4,381,427 A | 4/1983 | Cheal et al. | ............... 179/2 DP |
| 4,493,092 A | 1/1985 | Adams | |
| 4,504,942 A | 3/1985 | Aro et al. | |
| 4,507,793 A | 3/1985 | Adams | |
| 4,512,025 A | 4/1985 | Frankel et al. | |
| 4,578,537 A | 3/1986 | Faggin et al. | |
| 4,608,686 A | 8/1986 | Barsellotti | |
| 4,627,046 A | 12/1986 | Bellamy | |
| 4,740,963 A | 4/1988 | Eckley | |
| 4,748,656 A | 5/1988 | Gibbs et al. | |
| 4,757,497 A | 7/1988 | Beierle et al. | ................. 370/89 |
| 4,843,606 A | 6/1989 | Bux et al. | ...................... 370/89 |
| 4,853,949 A | 8/1989 | Schorr et al. | |

(List continued on next page.)

FOREIGN PATENT DOCUMENTS

| | | | |
|---|---|---|---|
| EP | 0 841 831 A2 | 5/1998 | |
| GB | 2313979 A | 10/1997 | |
| WO | WO97/23078 | 6/1997 | |
| WO | WO 97/37458 | 10/1997 | |
| WO | WO 98/42104 | 9/1998 | ........... H04L/12/28 |
| WO | WO 99/49608 | 9/1999 | |
| WO | WO 00/56050 | 9/2000 | .......... H04M/11/00 |
| WO | WO 00/69131 | 11/2000 | ............ H04L/12/64 |
| WO | WO 01/05130 A1 | 1/2001 | ............ H04M/3/48 |
| WO | WO 01/06720 | 1/2001 | ........... H04Q/11/04 |
| WO | WO 01/13593 A1 | 2/2001 | |
| WO | WO 01/13618 A1 | 2/2001 | |

OTHER PUBLICATIONS

L. Van Hauwermeiren, et al., "Offering Video Services over Twisted Pair Cables to the Residential Subscriber by means of an ATM based ADSL Transmission System," ISS Symposium, vol. 1, 5 pages, Apr. 1995.

(List continued on next page.)

Primary Examiner—Douglas Olms
Assistant Examiner—Bob A. Phunkulh
(74) Attorney, Agent, or Firm—Baker Botts L.L.P.

(57) ABSTRACT

A voice gateway (64) includes an input port (70) that receives a voice signal from an unbundled analog line (62) coupled to a Class 5 switch (52). The voice signal is converted to a digital format by an analog-to-digital and digital-to-analog converting unit (76). The voice signal is placed into a compressed format by a compressing/decompressing unit (80) using a selected one of a plurality of compression ratios. The voice signal is placed into a transport frame by a packetizing/depacketizing unit (84) according to a selected packet format. The voice signal is multiplexed with other voice signals by an output port (88). The output port (88) places the voice signal onto a selected one of a plurality of output lines in order to transport the voice signal in its transport frame to one of an office customer premises (12) and a residence customer premises (14).

47 Claims, 2 Drawing Sheets

U.S. PATENT DOCUMENTS

| | | | |
|---|---|---|---|
| 4,881,226 A | 11/1989 | Lechner et al. | |
| 4,903,292 A | 2/1990 | Dillon | |
| 5,033,062 A | 7/1991 | Morrow et al. | |
| 5,034,948 A | 7/1991 | Mizutani et al. | |
| 5,042,028 A | 8/1991 | Ogawa | |
| 5,127,003 A | 6/1992 | Doll, Jr. et al. | |
| 5,134,611 A | 7/1992 | Steinka et al. | |
| 5,142,568 A | 8/1992 | Ogata et al. | |
| 5,142,571 A | 8/1992 | Suzuki et al. | |
| 5,151,923 A | 9/1992 | Fujiwara | |
| 5,216,704 A | 6/1993 | Williams et al. | |
| 5,220,560 A | 6/1993 | Ogasawara | |
| 5,247,347 A | 9/1993 | Litteral et al. | 358/85 |
| 5,267,300 A | 11/1993 | Kao et al. | |
| 5,305,312 A | 4/1994 | Fornek et al. | 370/62 |
| 5,317,627 A | 5/1994 | Richardson, Jr. et al. | |
| 5,341,374 A | 8/1994 | Lewen et al. | 370/85.4 |
| 5,349,640 A | 9/1994 | Dunn et al. | |
| 5,367,522 A | 11/1994 | Otani | 370/84 |
| 5,410,343 A | 4/1995 | Coddington et al. | |
| 5,426,692 A | 6/1995 | Fujise | |
| 5,448,635 A | 9/1995 | Biehl et al. | 379/399 |
| 5,459,788 A | 10/1995 | Kim | |
| 5,473,675 A | 12/1995 | Chapman et al. | |
| 5,479,447 A | 12/1995 | Chow et al. | |
| 5,493,609 A | 2/1996 | Winseck, Jr. et al. | 379/96 |
| 5,499,241 A | 3/1996 | Thompson et al. | |
| 5,535,198 A | 7/1996 | Baker et al. | |
| 5,604,737 A | 2/1997 | Iwami et al. | |
| 5,606,553 A | 2/1997 | Christie et al. | 370/394 |
| 5,610,910 A | 3/1997 | Focsaneanu et al. | 370/351 |
| 5,610,922 A | 3/1997 | Balatoni | |
| 5,613,069 A * | 3/1997 | Walker | 709/238 |
| 5,617,423 A | 4/1997 | Li et al. | |
| 5,625,404 A | 4/1997 | Grady et al. | 348/7 |
| 5,625,685 A | 4/1997 | Allegranza et al. | |
| 5,638,363 A | 6/1997 | Gittins et al. | |
| 5,661,785 A | 8/1997 | Carpenter et al. | |
| 5,668,857 A | 9/1997 | McHale | |
| 5,671,251 A | 9/1997 | Blackwell et al. | |
| 5,673,290 A | 9/1997 | Cioffi | |
| 5,675,575 A | 10/1997 | Wall, Jr. et al. | |
| 5,692,035 A | 11/1997 | O'Mahony et al. | 379/93 |
| 5,719,870 A | 2/1998 | Baker et al. | |
| 5,737,333 A | 4/1998 | Civanlar et al. | |
| 5,771,236 A | 6/1998 | Sansom et al. | |
| 5,781,547 A | 7/1998 | Wilson | |
| 5,781,617 A | 7/1998 | McHale et al. | |
| 5,787,088 A | 7/1998 | Dagdeviren et al. | |
| 5,793,843 A | 8/1998 | Morris | 379/59 |
| 5,828,666 A | 10/1998 | Focsaneanu et al. | |
| 5,838,682 A | 11/1998 | Dekelbaum et al. | |
| 5,841,840 A | 11/1998 | Smith et al. | |
| 5,848,150 A | 12/1998 | Bingel | |
| 5,862,134 A | 1/1999 | Deng | 370/352 |
| 5,864,747 A | 1/1999 | Clark et al. | |
| 5,878,120 A | 3/1999 | O'Mahony | 379/93.09 |
| 5,881,142 A | 3/1999 | Frankel et al. | |
| 5,883,941 A | 3/1999 | Akers | |
| 5,889,773 A | 3/1999 | Stevenson, III | |
| 5,889,774 A | 3/1999 | Mirashrafi et al. | 370/352 |
| 5,889,856 A | 3/1999 | O'Toole et al. | |
| 5,896,377 A | 4/1999 | Boot et al. | |
| 5,898,761 A | 4/1999 | McHale et al. | |
| 5,901,205 A | 5/1999 | Smith et al. | |
| 5,905,781 A | 5/1999 | McHale et al. | |
| 5,907,548 A | 5/1999 | Bernstein | 370/353 |
| 5,917,814 A | 6/1999 | Balatoni | |
| 5,936,952 A | 8/1999 | Lecomte | 370/352 |
| 5,940,479 A | 8/1999 | Guy et al. | |
| 5,943,404 A | 8/1999 | Sansom et al. | |
| 5,949,763 A * | 9/1999 | Lund | 370/261 |
| 5,974,043 A | 10/1999 | Solomon | 370/352 |
| 5,978,390 A | 11/1999 | Balatoni | |
| 5,982,767 A | 11/1999 | McIntosh | 370/352 |
| 5,991,292 A | 11/1999 | Focsaneanu et al. | 370/352 |
| 5,999,565 A | 12/1999 | Locklear, Jr. et al. | |
| 5,999,598 A | 12/1999 | Henrick et al. | |
| 6,075,784 A | 6/2000 | Frankel et al. | |
| 6,075,796 A | 6/2000 | Katseff et al. | 370/466 |
| 6,078,580 A | 6/2000 | Mandalia et al. | 370/352 |
| 6,081,517 A * | 6/2000 | Liu et al. | 370/352 |
| 6,101,182 A | 8/2000 | Sistanizadeh et al. | 370/352 |
| 6,112,084 A | 8/2000 | Sicher et al. | 455/426 |
| 6,118,780 A | 9/2000 | Dunn et al. | 370/355 |
| 6,125,113 A | 9/2000 | Farris et al. | 370/389 |
| 6,130,879 A * | 10/2000 | Liu | 370/230 |
| 6,130,883 A | 10/2000 | Spear et al. | 370/328 |
| 6,134,235 A | 10/2000 | Goldman et al. | 370/352 |
| 6,141,339 A | 10/2000 | Kaplan et al. | 370/352 |
| 6,144,667 A | 11/2000 | Doshi et al. | 370/401 |
| 6,144,670 A | 11/2000 | Sponaugle et al. | 370/401 |
| 6,154,445 A | 11/2000 | Farris et al. | 370/237 |
| 6,157,637 A | 12/2000 | Galand et al. | 370/356 |
| 6,167,042 A | 12/2000 | Garland et al. | 370/354 |
| 6,175,562 B1 | 1/2001 | Cave | 370/352 |
| 6,175,854 B1 | 1/2001 | Bretscher | 709/201 |
| 6,181,694 B1 | 1/2001 | Pickett | 370/353 |
| 6,181,715 B1 | 1/2001 | Phillips et al. | |
| 6,201,806 B1 | 3/2001 | Moffett | 370/356 |
| 6,208,639 B1 | 3/2001 | Murai | 370/356 |
| 6,222,829 B1 | 4/2001 | Karlsson et al. | 370/329 |
| 6,229,810 B1 | 5/2001 | Gerszberg et al. | 370/401 |
| 6,236,653 B1 | 5/2001 | Dalton et al. | 370/352 |
| 6,240,084 B1 | 5/2001 | Oran et al. | 370/352 |
| 6,240,085 B1 | 5/2001 | Iwami et al. | 370/352 |
| 6,243,377 B1 | 6/2001 | Phillips et al. | 370/354 |
| 6,243,398 B1 | 6/2001 | Kahane et al. | 370/522 |
| 6,259,708 B1 | 7/2001 | Cheng et al. | 370/493 |
| 6,262,979 B1 | 7/2001 | Anderson et al. | 370/267 |

OTHER PUBLICATIONS

T.C. Kwok, "Residential Broadband Architecture Over ADSL and G.Lite (G.992.2): PPP Over ATM," XP-000830885, IEEE Communication Magazine, 6 pages, May 1999.

Notification of Transmittal of the International Search Report or the Declaration, 7 pages, May 2, 2001.

Notification of Transmittal of the International Search Report or the Declaration, 7 pages, Jun. 29, 2001.

\* cited by examiner

METHOD AND APPARATUS FOR PROVIDING VOICE SIGNALS TO AND FROM A TELECOMMUNICATIONS SWITCH

TECHNICAL FIELD OF THE INVENTION

The present invention relates in general to telecommunications signal processing and more particularly to a method and apparatus for providing voice signals to and from a telecommunications switch.

BACKGROUND OF THE INVENTION

The traditional circuit switched telecommunications network has been implemented to dedicate one voice line to one loop or copper pair. This has worked well for over a hundred years but does not efficiently utilize the bandwidth of the copper pair. In addition, there has been a surge in demand for second, and even third, residential phone lines. This demand is exhausting the supply of available copper circuits. Business customers also have a high demand for phone lines. To meet this demand, Regional Bell Operating Companies, Independent Local Exchange Carriers, and Competitive Local Exchange Carriers would have to build additional copper or fiber infrastructure.

New technology, such as Digital Subscriber Line, voice-over-IP, and asynchronous transfer mode techniques have created an environment where the copper pair's available bandwidth can be more fully utilized to carry voice and data. However, traditional voice traffic is time division multiplexed, a transport architecture that segments the network bandwidth into fixed time sequenced channels. The smallest channel is equivalent to a voice line. Time division multiplexed networks work well for uncompressed analog voice but not for bursty data. If a data network needs more than 64 kilobits per second of bandwidth, the amount of one channel, two channels would be needed to carry 65 kilobits per second, resulting in bandwidth inefficiencies.

With the explosion of the Internet, worldwide deployment of Digital Subscriber Lines will rapidly accelerate over the next few years. Today, however, the penetration rate for voice over DSL is at zero percent. With the increase in their deployment, DSL is a prime candidate for implementing a multiple voice line capability for telecommunications customers. There have been recent efforts to provide voice over DSL. However, these efforts have required a GR-303 connection with a Class 5 switch for the gateway device. This GR-303 connection is available at the regional bell operating company or independent local exchange carrier level but competitive local exchange carriers would need to provide there own Class 5 switch or digital loop carrier functionality to interface with the GR-303 connection. In order to implement this functionality, competitive local exchange carriers would have to incur costly expense in providing this infrastructure. Therefore, it is desirable to migrate voice services into the data transport network in order to efficiently use the bandwidth of the copper pair and avoid expensive infrastructure changes in allowing a competitive local exchange carrier to implement an increased and efficient voice transport capability.

SUMMARY OF THE INVENTION

From the foregoing, it may be appreciated that a need has arisen to efficiently provide voice signal transport without bandwidth inefficiency. In accordance with the present invention, a method and apparatus for providing voice signals to and from a telecommunications switch are provided which substantially eliminate or reduce disadvantages and problems associated with conventional voice transport techniques.

According to an embodiment of the present invention, there is provided an apparatus for providing voice signals from a telecommunications switch that includes an input port operable to receive an unbundled analog line from the telecommunications switch, wherein a voice signal is carried over the analog line. An analog-to-digital converter unit converts the voice signal carried on the analog line into a digital format. A compressing unit places the voice signal into a compressed format. A packetizing unit places the voice signal into a packet format for transport over a data network.

The present invention provides various technical advantages over conventional voice transport techniques. For example, one technical advantage is to provide unbundled analog line ports to a competitive local exchange carrier without the need for an overlay Class 5 switch or digital loop carrier architecture. Another technical advantage is to mimic the dynamic allocation of timeslots of a standard GR-303 interface without utilizing that interface in order to provide an oversubscription capability. Yet another technical advantage is the ability to support a multitude of voice transport framing philosophies. Still another technical advantage is to provide selective compression and packetizing capabilities for versatile voice transport operation. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
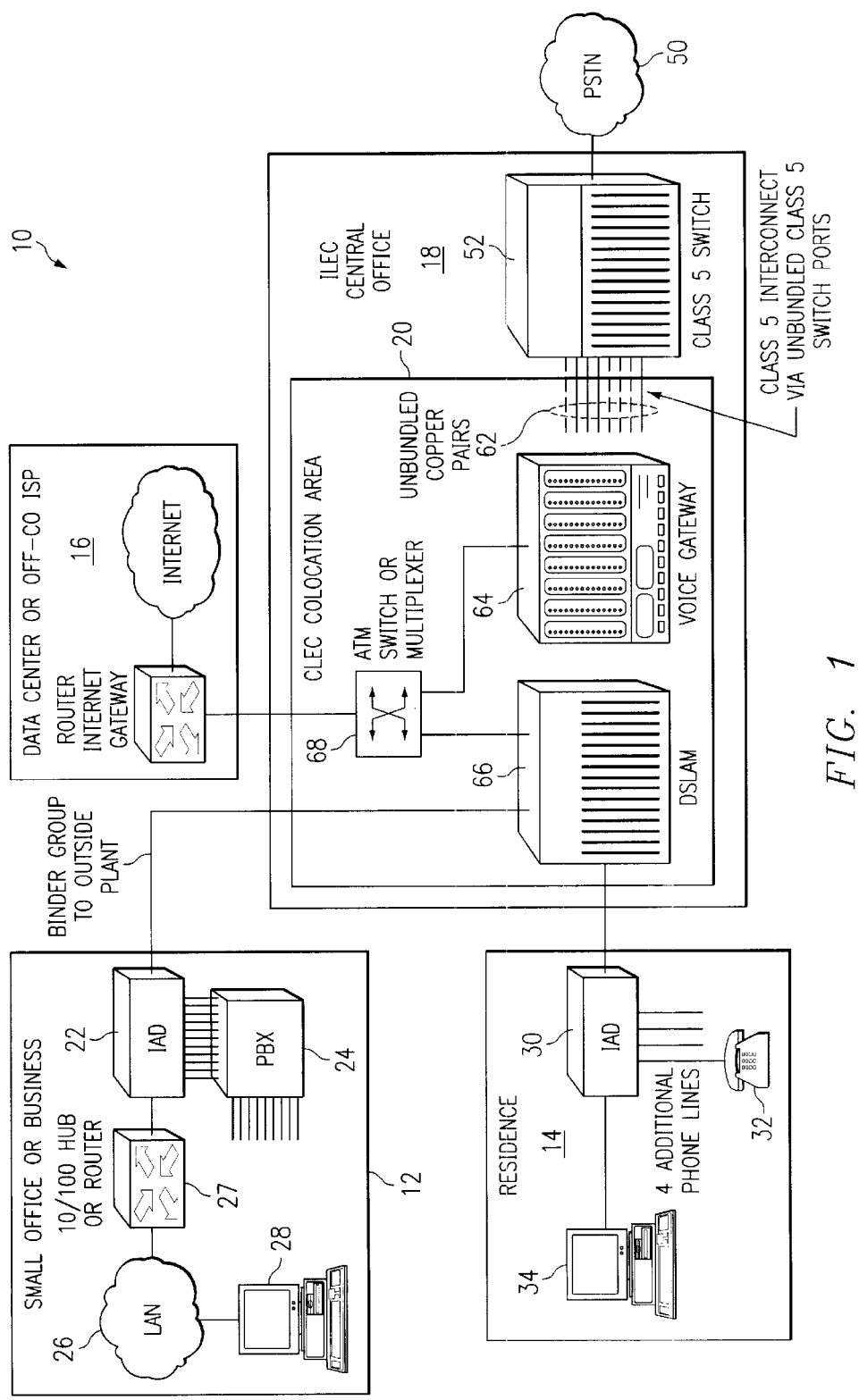
FIG. 1 illustrates a block diagram of a telecommunications network.

FIG. 1 is a block diagram of a portion of a telecommunications network 10. Telecommunications network 10 includes one or more office customer premises 12, one or more residence customer premises 14, one or more information service providers 16, one or more independent local exchange carrier central offices 18, and one or more competitive local exchange carriers 20.

Office customer premises 12 may receive data and voice at an Integrated Access Device (IAD) 22. IAD 22 may provide data and voice to a private branch exchange 24 in order to support telephony operations at telephony devices 25 within office customer premises 12. IAD 22 may also provide data and voice to a local area network 26 through a router 27. Local area network 26 may have computers or other devices 28 connected thereto for processing the data and voice received from IAD 22 in order to support computer processing and telephony capability over local area network 26. Data and voice generated by devices 25 and 28 connected to local area network and private branch exchange 24 may also be transferred out of office customer premises 12 by IAD 22.

Residence customer premises 14 may receive data and voice at an IAD 30. IAD 30 may provide data and voice to telephony devices 32 and also to computing devices 34 connected thereto. Data and voice generated by either telephony devices 32 or computing devices 34 or both may be transferred out of residence customer premises 14 through IAD 30.

Information service provider 16 may receive data at an Internet gateway 40 from competitive local exchange carrier 20. Internet gateway 40 provides the interface to Internet 42. Information service provider 16 supports connections to Internet 42 for the passage of data thereto and therefrom through Internet gateway 40 as received from or provided to competitive local exchange carrier 20.

Independent local exchange carrier central office 18 may receive data and voice carried by a public switched telephone network 50. A Class 5 switch 52 is the interface to and from public switched telephone network 50. Class 5 switch 52 passes voice and data received from public switched telephone network 50 to competitive local exchange carrier 20. Competitive local exchange carrier 20 provides voice and data to office customer premises 12 and residence customer premises 14 from Class 5 switch 52. Voice and data may be received from office customer premises 12 and residence customer premises 14 by competitive local exchange carrier 20 for transfer to Class 5 switch 52.

Competitive local exchange carrier 20 includes a voice gateway 64 receives voice and data from and provides voice and data Class 5 switch 52. Unbundled analog line connections 62 are provided from Class 5 switch 52 to voice gateway 64. By providing a capability to interconnect to Class 5 switch 52 using standard unbundled analog lines 62, competitive local exchange carrier 20 is able to provide voice functionality over its broadband network without needing its own overlay Class 5 switch or digital loop carrier architecture. A Digital Subscriber Line Access Multiplexer (DSLAM) device 66 provides an interface for voice and data with office customer premises 12 and residence customer premises 14. DSLAM device 66 and voice gateway 64 pass voice and data to and from each other or to and from information service provider 16 through a packet switch 68. Packet switch 68 may operate using any of a variety of packet techniques to include asynchronous transfer mode and frame relay. Voice and data may be transferred throughout telecommunications network 10 in any of a variety of packet formats to include asynchronous transfer mode cells, frame relay packets, and Internet protocol. Competitive local exchange carrier 20 may also implement multiple packet switches 68, each using a different packet technique. Though shown, competitive local exchange carrier 20 need not be colocated with independent local exchange carrier central office 18.

For voice operation from public switched telephone network 50, a voice signal is transferred over public switched telephone network 50 to Class 5 switch 52. Class 5 switch 52 routes the voice signal to voice gateway 64 over an unbundled analog line 62. Voice gateway processes the voice signal for transfer to DSLAM device 66 through packet switch 68. The processing that may be performed by voice gateway 64 may include multiplexing, analog-to digital conversion, compression, and packetizing. DSLAM device 66 provides the voice signal to its intended destination, such as office customer premises 12 or residence customer premises 14.

For voice operation to public switched telephone network 50, a voice signal is generated at, for example, office customer premises 12 and transferred to DSLAM device 66. DSLAM device 66 receives the voice signal from office customer premises 12 and prepares the voice signal for transport over packet switch 68 to voice gateway 64. Upon receipt of the voice signal, voice gateway 64 converts the voice signal into its appropriate analog format for transfer over an unbundled analog line 62. The unbundled analog line 62 carries the voice signal to Class 5 switch 52. Class 5 switch 52 transfers the voice signal to its appropriate destination on public switched telephone network 50.

Voice gateway 64 provides a capability to packetize and compress circuit switched voice circuits from public switched telephone network 50 and deliver them over broadband networks to business and residential customers. With this capability, telecommunications service providers may offer, according to the preferred embodiment, twentyfour independent voice lines over one Digital Subscriber Line circuit. Voice gateway 64 supports a variety of types of network framing, such as voice over asynchronous transfer mode and voice over Internet protocol. Additionally, voice gateway 64 supports the latest in voice compression technologies so that calls placed through voice gateway 64 sound similar to calls placed over public switched telephone network 50. Multiple phone lines can be imbedded into the broadband data stream and additional lines can be added or subtracted on demand over a single copper circuit.

Figure 2:
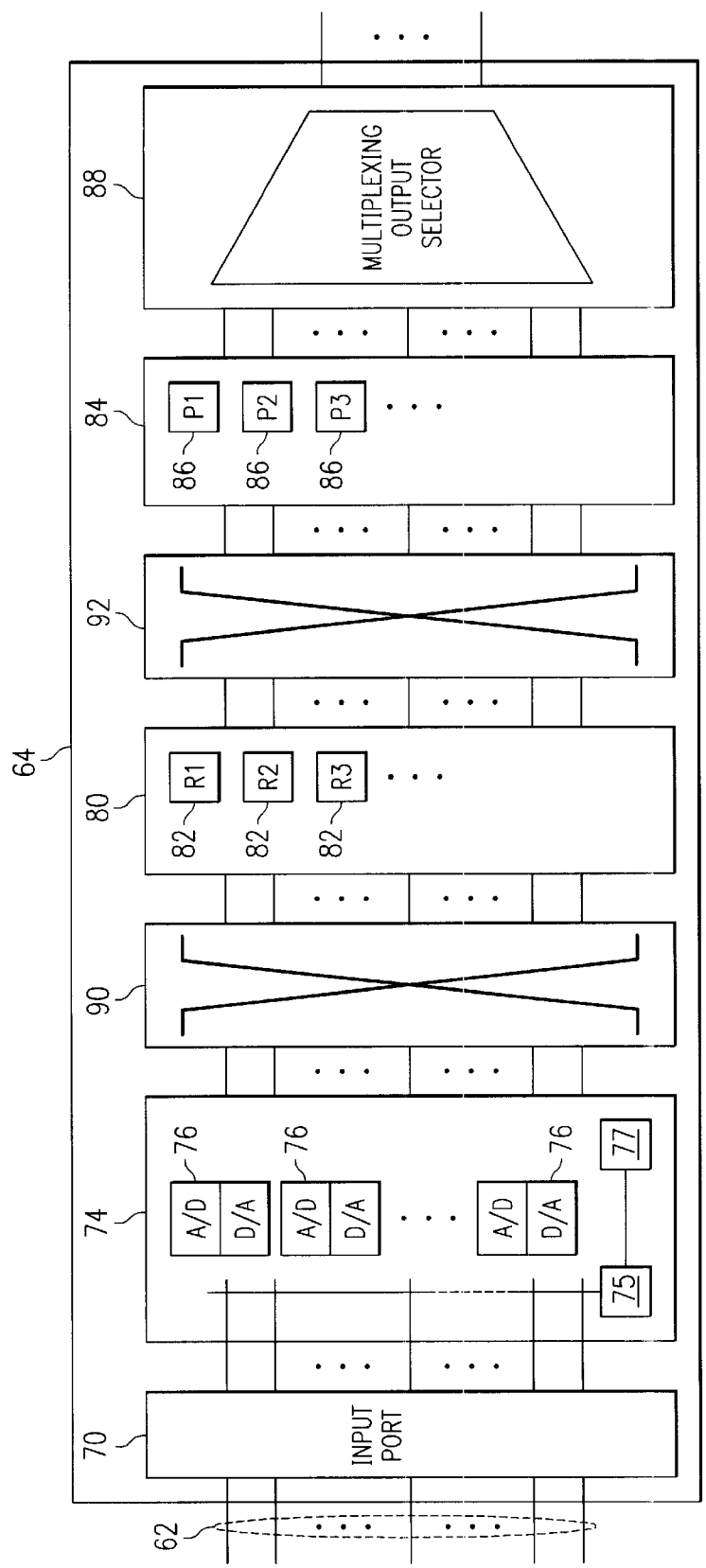
FIG. 2 illustrates a block diagram of a voice gateway within the telecommunications network.

FIG. 2 is a block diagram of voice gateway 64. Voice gateway 64 includes an input port 70 to receive and provide voice signals from and to unbundled analog lines 62 of Class 5 switch 52. An analog-to-digital and digital-to analog converter unit 76 includes A/D and D/A converters 78 that convert voice signals received from unbundled analog lines 62 into a digital format and convert voice signals transferred to unbundled analog lines 62 into an analog format. A compressing/decompressing unit 80 includes compressors/decompressors 82 that compress voice signals received from A/D and D/A converters 78 into a compressed format and decompress voice signals prior to conversion into analog format. A packetizing unit 84 includes packetizers/depacketizers 86 that packetize voice signals into a packet format and depacket voice signals from the packet format prior to decompression. An output port 88 provides voice signals to and receives voice signals from DSLAM device 66 through packet switch 68. Output port 88 is capable of multiplexing multiple voice signals together through interleaving of packets of different voice signals onto an output line to packet switch 68. Output port 88 may also selectively place any voice signal onto any of its output lines according to the destination characteristics of each voice signal. For example, output port may multiplex five voice signals onto a first output line and multiplex three other voice signals onto a second output line.

Compressors/decompressors 82 may implement different compression ratios. For example, compressor/decompressor R1 may perform voice compression using the standard G.711 compression technique of 64 kilobits per second pulse code modulation. Compressor/decompressor R2 may perform voice compression using the standard G.722 compression technique of 32 kilobits per second adaptive differential pulse code modulation. Compressor/decompressor R3 may perform voice compression using the standard G.726 compression technique of 16 kilobits per second compression. Whichever compression technique is selected for a voice signal, a customer experience of placing a call through voice gateway 64 will be indistinguishable from a call placed only over public switched telephone network 50. Selection of which compression technique to perform on a particular voice signal is determined by the configuration of a first switching matrix 90. First switching matrix 90 is capable of dynamically routing any voice signal received to any one of compressors/decompressors 82 in order to support selective compression of voice signals. Appropriate decompression is also performed followed by selective routing through first switching matrix 90 to an appropriate A/D and D/A converter 78.

Packetizers/depacketizers 86 may implement different transport framing philosophies. For example, packetizer/depacketizer P1 may packetize the voice signal into asynchronous transfer mode cells. Packetizer/depacketizer P2 may packetize the voice signal into frame relay packets. Packetizer/depacketizer P3 may packetize the voice signal into an Internet protocol format. The Internet protocol format may then be carried in the asynchronous transfer mode or frame relay format. Selection of which packetizing technique to perform on a particular voice signal is determined by the configuration of a second switching matrix 92. Second switching matrix 92 is capable of dynamically routing any voice signal received to any one of packetizers/depacketizers 86 in order to support selective packetizing of voice signals. Appropriate depacketizing is also performed followed by selective routing through second switching matrix 92 to an appropriate compressor/decompressor 82.

For voice operation from Class 5 switch 52, a voice signal carried over an associated unbundled analog line 62 is received at input port 70. Input port 70 performs electrical analog termination of the incoming unbundled analog line 62 and insures that the lines are properly terminated. Input port 70 provides the voice signal to a corresponding A/D and D/A converter 76 in analog-to-digital and digital-to-analog converter unit 74. Analog-to-digital and digital-to-analog converter unit 74 may also perform coding and decoding functions of a conventional CODEC unit to include a ring and digit detection unit 75. A control processor 77 may be part of analog-to-digital and digital-to-analog converter unit 74 to supervise and control CODEC functionality. A distinctive ring detection may also be employed to provide an oversubscription capability discussed in more detail later. Analog-to-digital and digital-to-analog converter unit 74 detects a ring condition on unbundled analog line 62 and the corresponding A/D and D/A converter 78 places the voice signal into a digital format. The digitized voice signal passes through first switching matrix 90 where it is routed to a desired compressor/decompressor 82 in compressing/decompressing unit 80. The voice signal is compressed and passes through second switching matrix 92 where it is routed to a desired packetizer/depacketizer 86 in packetizing/depacketizing unit 84. The voice signal in its packet format transfers through output port 88, possibly multiplexed with other packetized voice signals, and is passed to DSLAM device 66 over an appropriate output line through packet switch 68 for ultimate delivery to office customer premises 12 or residence customer premises 14 over associated digital subscriber lines.

For voice operation to Class 5 switch 52, the voice signal is originated at office customer premises 12 or residence customer premises 14, passes through DSLAM device 66 and packet switch 68, and is received at output port 88 of voice gateway 64. Output port 88 demultiplexes the voice signal provides the voice signal to an associated packetizer/depacketizer 86 in packetizing/depacketizing unit 84 according to an available unbundled analog line 62. The packetizer/depacketizer 86 removes the voice signal from its transport frame. The voice signal then passes through second switching matrix 92 for routing to an appropriate compressor/decompressor 82 in compressing/decompressing unit 80. Compressor/decompressor 82 decompresses the voice signal into its full digital format. The voice signal then passes through first switching matrix 90 for routing to an appropriate A/D and D/A converter 78 in analog-to-digital and digital-to-analog converting unit 76. A/D and D/A converter 78 places the voice signal into its analog format. The voice signal is then placed onto its corresponding unbundled analog line 62 at input port 70. The voice signal then passes on to Class 5 switch 52 for further routing through public switched telephone network 50.

Voice gateway 64 may also support an oversubscription capability. Each unbundled analog line 62 may be provisioned to carry voice traffic in a 1:1 ratio where there are the same number of unbundled analog lines 62 for each telephone number. Each unbundled analog line 62 may also be oversubscribed, for example in a 4:1 ratio, where there are four telephone numbers per unbundled analog line 62. Unbundled analog line 62 may also be an Integrated Services Digital Network Basic Rate Interface line with a capability to transfer two simultaneous voice channels. The use of this type of line allows for the immediate doubling of call capacity with or without oversubscription.

For outgoing calls toward Class 5 switch 52, a first telephone device associated with a first one of the four telephone numbers may be in use and thus occupying its associated unbundled analog line 62. A second telephone device associated with a second one of the telephone numbers may be put into use as long as there is a free unbundled analog line 62 connected to voice gateway 64. Output port 88 determines if there is a free unbundled analog line 62 available for connection of the second telephone device, such as through a hunt group search. Output port 88 is capable of connecting any telephone device of office customer premises 12 and residence customer premises 14 to any available unbundled analog line 62 in order to support the oversubscription capability.

For incoming calls from Class 5 switch 52, voice gateway 64 is capable of detecting a distinctive ring given to each telephone number assigned to unbundled analog line 62. In the 4:1 oversubscription example, each of the four telephone numbers has its own unique ring associated therewith. Voice gateway 64 determines which of the customer telephone devices to route the call to according to the detected ring. Though described with reference to a 4:1 ratio, other oversubscription ratios may be equally implemented through this technique.

Thus, it is apparent that there has been provided, in accordance with the present invention, a method and apparatus for providing voice signals to and from a telecommunications switch that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. An apparatus for communicating voice information, comprising:
   an input port operable to receive a plurality of voice signals from one of a plurality of unbundled analog lines;
   an analog-to-digital converter unit operable to convert the plurality of voice signals into a plurality of digital signals;

a packetizing unit operable to generate digital packets encapsulating the plurality of digital signals, the packetizing unit including a plurality of packetizers, each packetizer operable to convert the plurality of digital signals into digital packets according to different packet standards;

a switching matrix operable to selectively provide the digital signals to the plurality of packetizers, the packetizing unit operable to generate packets for successive voice signals with different packet standards; and an output port operable to pass the digital packets to a customer premises interface for communication to a customer premises.

2. The apparatus of claim 1, wherein the input port is further operable to provide an electrical termination of the unbundled analog lines.

3. The apparatus of claim 1, wherein the input port is further operable to couple to a Class 5 switch through the plurality of unbundled analog lines without using an overlay Class 5 switch or digital loop carrier architecture.

4. The apparatus of claim 1, further comprising a compressing unit operable to compress the plurality of digital signals, the compressor unit including a plurality of compressors, each compressor operable to compress the plurality of digital signals according to a different compression standard.

5. The apparatus of claim 4, wherein the compressing unit performs voice compression according to a G.711, G.722, or G.726 standard.

6. The apparatus of claim 4, further comprising a switching matrix operable to selectively provide the digital signals to the plurality of compressors, the compressor unit operable to generate compressed digital signals for successive voice signals with different compression standards.

7. The apparatus of claim 1, wherein the packetizing unit generates the digital packets according to an Internet Protocol (IP), Asynchronous Transfer Mode (ATM), or Frame Relay standard.

8. The apparatus of claim 1, wherein the output port is further operable to interleave digital packets corresponding to two or more voice signals.

9. The apparatus of claim 1, wherein the output port is further operable to pass the digital packets to a selected one of a plurality of output lines according to a destination characteristic of the voice signal.

10. The apparatus of claim 1, wherein the customer premises interface is a Digital Subscriber Line Access Multiplexer (DSLAM).

11. The apparatus of claim 1, wherein the customer premises interface is operable to communicate digital packets corresponding to at least twenty-four voice signals to the customer premises using a single output line.

12. The apparatus of claim 1, wherein the customer premises interface is operable to communicate the digital packets in a local loop using a digital subscriber line.

13. A method of communicating voice information using a voice gateway coupled to unbundled analog lines of a telecommunications switch, comprising:

receiving a plurality of voice signals from a plurality of the unbundled analog lines of the telecommunications switch;

converting the plurality of voice signals into a plurality of associated digital signals;

selecting via a switching matrix one of a plurality of different packet standards for each of the plurality of digital signals;

generating digital packets from the plurality of digital signals according to the packet standard selected for each of the plurality of digital signals; and passing the digital packets to a customer premises interface for communication to a customer premises.

14. The method of claim 13, further comprising providing an electrical termination of the unbundled analog lines using the voice gateway.

15. The method of claim 13, wherein:

the telecommunications switch is a Class 5 switch; and the voice gateway couples to the Class 5 switch without using an overlay Class 5 switch or digital loop carrier architecture.

16. The method of claim 13, further comprising compressing the plurality of digital signals prior to generating the digital packets.

17. The method of claim 13, further comprising:

determining one of a plurality of different compression techniques for each of the plurality of digital signals;

selecting a compressor to perform the determined compression technique for each of the plurality of digital signals; and compressing each of the plurality of digital signals using the selected compressor.

18. The method of claim 13, further comprising generating the digital packets according to an Internet Protocol (IP), Asynchronous Transfer Mode (ATM), or Frame Relay standard.

19. The method of claim 13, wherein communicating the digital packets further comprises interleaving digital packets corresponding to two or more voice signals.

20. The method of claim 13, further comprising passing the digital packets to a selected one of a plurality of output lines according to a destination characteristic of the voice signal.

21. The method of claim 13, wherein the customer premises interface is a Digital Subscriber Line Access Multiplexer (DSLAM).

22. The method of claim 13, wherein the customer premises interface is operable to communicate digital packets corresponding to at least twenty-four voice signals to the customer premises using a single output line.

23. The method of claim 13, wherein the customer premises interface is operable to communicate the digital packets in a local loop using a digital subscriber line.

24. A system for communicating voice information, comprising:

a telecommunications switch operable to receive voice signals from a telephone network and to communicate the voice signals using a plurality of unbundled lines;

a voice gateway coupled to the telecommunications switch, the voice gateway operable to receive the voice signals using the unbundled lines, the voice gateway operable to process the voice signals into digital packets according to different packet standards individually determined and selected for each voice signal, the voice gateway including a switching matrix to route each voice signal according to its selected packet standard; and a customer premises interface coupled to the voice gateway and operable to receive the digital packets from the voice gateway and to communicate the digital packets to a customer premises using an output line.

25. The system of claim 24, wherein:

the customer premises interface is further operable to receive digital packets from the customer premises using the output line and to communicate the digital packets to the voice gateway;

the voice gateway is further operable to receive the digital packets from the customer premises interface, the voice gateway operable to identify the packet standard for each digital packet, the voice gateway operable to process the digital packets into voice signals suitable for communication to the telecommunications switch using the unbundled lines; and the telecommunications switch is further operable to receive the voice signals from the voice gateway using the unbundled lines and to communicate the voice signals to the telephone network.

26. The system of claim 24, wherein the voice gateway is further operable to provide an electrical termination of the unbundled lines.

27. The system of claim 24, wherein:

the telecommunications switch is a Class 5 switch; and the voice gateway couples to the Class 5 switch without using an overlay Class 5 switch or digital loop carrier architecture.

28. The system of claim 24, wherein the voice gateway processes the voice signals into digital packets according to an Internet Protocol (IP), Asynchronous Transfer Mode (ATM), or Frame Relay standard.

29. The system of claim 24, wherein the voice gateway communicates the digital packets to the customer premises interface by interleaving digital packets corresponding to two or more voice signals.

30. The system of claim 24, wherein the voice gateway communicates the digital packets to the customer premises interface using one or more packet switches.

31. The system of claim 24, wherein the customer premises interface is operable to communicate digital packets corresponding to at least twenty-four voice signals to the customer premises using the output line.

32. The system of claim 24, wherein the output line is a digital subscriber line operable to communicate the digital packets to the customer premises using a twisted pair in a local loop.

33. The system of claim 24, wherein the customer premises interface is a Digital Subscriber Line Access Multiplexer (DSLAM).

34. The system of claim 24, further comprising an Integrated Access Device (IAD) coupled to the customer premises interface, the IAD operable to receive the digital packets using the output line and to process the digital packets to provide voice information to telephony devices or computing devices at the customer premises.

35. The system of claim 24, wherein the unbundled lines are Integrated Services Digital Network Basic Rate Interface lines.

36. A method of communicating voice information, comprising:

receiving, at a telecommunications switch, voice signals from a telephone network;

communicating the voice signals from the telecommunications switch to a voice gateway using multiple unbundled lines;

receiving the voice signals at the voice gateway using the unbundled lines;

selecting one of a plurality of different compression standards for each voice signal;

performing compression of each voice signal according to its selected compression standard;

selecting one of a plurality of different packet standards for each voice signal;

processing each of the voice signals into digital packets according to its selected packet standard;

communicating the digital packets from the voice gateway to a customer premises interface; and communicating the digital packets from the customer premises interface to a customer premises using an output line.

37. The method of claim 36, further comprising:

receiving, at the customer premises interface, return digital packets from the customer premises using the output line;

communicating the return digital packets from the customer premises interface to the voice gateway;

identifying a packet standard for each of the return digital packets;

processing each of the return digital packets into return voice signals suitable for communication to the telecommunications switch using the unbundled lines according to its identified packet standard;

identifying a compression standard for each return voice signal;

decompressing each of the return voice signals according to its identified compression standard;

communicating the return voice signals to the telecommunications switch using the unbundled lines; and communicating the return voice signals from the telecommunications switch to the telephone network.

38. The method of claim 36, further comprising providing an electrical termination of the unbundled lines using the voice gateway.

39. The method of claim 36, wherein:

the telecommunications switch is a Class 5 switch; and the voice gateway couples to the Class 5 switch without using an overlay Class 5 switch or digital loop carrier architecture.

40. The method of claim 36, further comprising processing the voice signals into digital packets according to an Internet Protocol (IP), Asynchronous Transfer Mode (ATM), or Frame Relay standard.

41. The method of claim 36, wherein communicating the digital packets from the voice gateway to the customer premises interface further comprises interleaving digital packets corresponding to two or more voice signals.

42. The method of claim 36, wherein communicating the digital packets from the voice gateway to the customer premises interface is performed using one or more packet switches.

43. The method of claim 36, further comprising communicating digital packets corresponding to at least twenty-four voice signals from the customer premises interface to the customer premises using the output line.

44. The method of claim 36, wherein:

the output line is a digital subscriber line; and communicating the digital packets from the customer premises interface to the customer premises further comprises using the digital subscriber line to communicate the digital packets over a twisted pair in a local loop.

45. The method of claim 36, wherein the customer premises interface is a Digital Subscriber Line Access Multiplexer (DSLAM).

46. The method of claim 36, further comprising:

receiving the digital packets at an Integrated Access Device (IAD) using the output line; and processing the digital packets to provide voice information to telephony devices or computing devices at the customer premises.

47. The method of claim 30, wherein the unbundled lines are Integrated Services Digital Network Basic Rate Interface lines.

* * * * *